United States Patent [19]
Swaroop et al.

[11] Patent Number: 5,447,694
[45] Date of Patent: Sep. 5, 1995

[54] EXHAUST GAS CONVERSION METHOD AND APPARATUS USING THERMALLY STABLE ZEOLITES

[75] Inventors: Srinivas H. Swaroop; Raja R. Wusirika, both of Painted Post, N.Y.

[73] Assignee: Corning Incorporated, Corning, N.Y.

[21] Appl. No.: 183,472

[22] Filed: Jan. 18, 1994

Related U.S. Application Data

[63] Continuation of Ser. No. 963,605, Oct. 20, 1992, abandoned.

[51] Int. Cl.$^6$ .............................................. B01D 53/56
[52] U.S. Cl. ................................... 422/171; 422/177; 423/213.5; 423/213.7
[58] Field of Search ................. 422/171, 177; 60/297, 60/299; 423/213.5, 213.7; 502/65

[56] References Cited

U.S. PATENT DOCUMENTS 5,185,305  2/1993  Subramanian et al. ................ 502/65

FOREIGN PATENT DOCUMENTS

0541271A1  10/1992  European Pat. Off. .

*Primary Examiner*—Timothy M. McMahon
*Attorney, Agent, or Firm*—L. Rita Quatrini

[57] ABSTRACT

A system and method are disclosed for converting exhaust gas which comprises $NO_x$, CO, and hydrocarbons, to innocuous products. Exhaust gas is contacted in undiverted flow with a zeolite suitable for adsorption of hydrocarbons, and with a main catalyst suitable for conversion of $NO_x$, CO, and hydrocarbons to innocuous products. Adsorption occurs when the temperature of the zeolite is suitable therefor. Conversion occurs when the temperature of the main catalyst is suitable therefor. The zeolite and main catalyst are connected directly to one another, that is, in-line, without by-pass valving. The zeolite can be Y zeolite, Beta, ZSM-5, and combinations thereof, and has a $SiO_2$ to $Al_2O_3$ mole ratio of no greater than about 200, and is ion exchanged with a metal which can be rare earth, chromium, and combinations thereof.

11 Claims, 2 Drawing Sheets

EXHAUST GAS CONVERSION METHOD AND APPARATUS USING THERMALLY STABLE ZEOLITES

This application is a continuation of application Ser. No. 07/963,605 filed Oct. 20, 1992, now abandoned.

This invention relates to an exhaust gas conversion method and apparatus in which a thermally stable zeolite placed in-line with the main converter, connected directly to the main converter without by-pass valving.

BACKGROUND OF THE INVENTION

Internal combustion engines emit a large amount of unburned hydrocarbons during cold engine start-up. In fact, a substantial fraction of the total emitted hydrocarbons have been found to occur during the first minutes due to the uncombusted hydrocarbons in the rich fuel mixture.

Low molecular weight hydrocarbons are especially troublesome as pollutants because they form ozone. Emission standards for low molecular weight hydrocarbons are becoming more stringent. Zeolites with relatively low $SiO_2$ to $Al_2O_3$ mole ratios are very suitable for adsorbing low molecular weight hydrocarbons. However, their thermal stablity is relatively low.

Release of hydrocarbons after start-up of an engine poses a special problem because at this point the temperature of the exhaust gas and the main catalyst are not high enough for conversion to innocuous products in the presence of conventional catalysts. The catalysts utilized in catalytic converter systems are generally ineffective at ambient temperature and must reach high temperatures, often in the range of 300°–400° C. before they are activated.

One approach to reducing cold start emissions is to temporarily adsorb hydrocarbons on zeolites. These methods involve using the zeolite adsorber in the exhaust stream in a "by-pass" mode. That is, the zeolite adsorber is exposed to the cold start exhaust, but once the main converter reaches its light-off temperature (about 300°–400° C.) a system of valves sends the exhaust directly to the main converter, by-passing the adsorber.

U.S. Pat. No. 4,985,210 relates to an exhaust gas purifying apparatus employing a 3-way catalyst which has either a Y-type zeolite or a mordenite as an adsorbent at the upstream side of the catalytic converter so that when the exhaust gas temperature is not higher than a specific temperature, a harmful component is adsorbed by means of the adsorbent, whereas when the exhaust gas temperature exceeds the specific temperature the harmful component is desorbed from the adsorbent and is introduced into the catalytic converter. Further, an activated carbon trapper and a by-pass are provided in parallel at the upstream side of the adsorbent so that the flow paths of the exhaust gas are selectively switched from one to the other in accordance with the level of the exhaust gas temperature.

U.S. Pat. No. 5,125,231 relates to an engine exhaust system designed to reduce hydrocarbon emissions having first and second catalytic converters. Exhaust gas is conveyed to the first and second converters depending on the temperature. Hydrocarbons are adsorbed in the second converter at lower temperatures, and desorb at higher temperatures and are conveyed to the first converter. A system of thermostatically controlled valves is used to convey the exhaust gas to the proper converter depending on the temperature.

In the above described by-pass modes of operation, the thermal demands on the zeolite in the adsorber are relatively simple. However, the demands on the valve system are quite significant, in that it must function reliably for at least 50,000 miles of driving, or even higher. In either situation, an expensive system of valves will be required, with safety and reliability always a concern.

Therefore, there is a need to develop an exhaust gas purification system which will effectively remove pollutants both at cold start and after warm-up, without the need for extra valving.

SUMMARY OF THE INVENTION

In accordance with one aspect of the invention, there is provided a method for converting exhaust gas which comprises $NO_x$, CO, and hydrocarbons, to innocuous products. The method comprises contacting the exhaust gas in undiverted flow with a zeolite suitable for adsorption of hydrocarbons, and with a main catalyst suitable for conversion of $NO_x$, CO, and hydrocarbons to innocuous products, to cause adsorption when the zeolite is at a temperature suitable therefor, and to cause conversion when the main catalyst is at a temperature suitable therefor. The zeolite can be Y zeolite, Beta, ZSM-5, and combinations thereof. The zeolite has a $SiO_2$ to $Al_2O_3$ mole ratio of no greater than about 200 and is ion exchanged with a rare earth, chromium, or combinations thereof.

In accordance with another aspect of the invention, there is provided an apparatus suitable for converting exhaust gases from an exhaust gas generating source, to innocuous products. The apparatus comprises a zeolite unit as described above for adsorbing hydrocarbons, a main catalyst unit for converting $NO_x$, CO, and hydrocarbons to innocuous products positioned downstream from the zeolite unit, and conduit means for connecting the units with one another and with the exhaust gas source, and for providing undiverted passage of the exhaust gas from the exhaust gas source sequentially to and through the units.

DETAILED DESCRIPTION OF THE INVENTION

Figure 1:
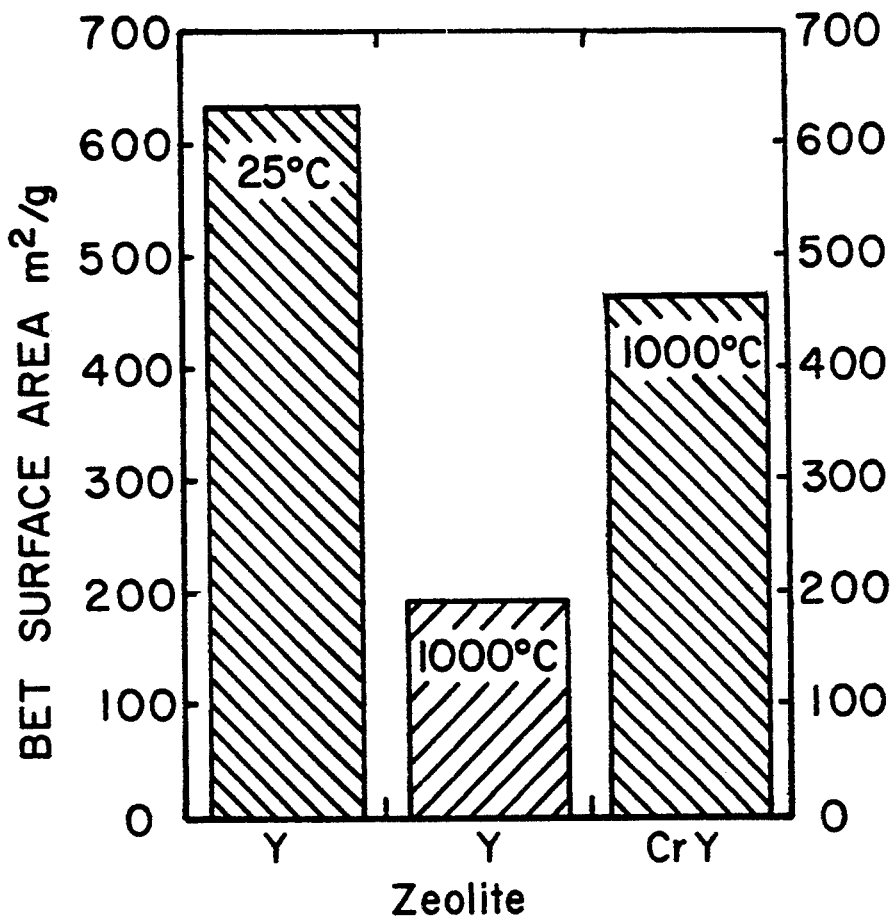
FIG. 1 is a plot showing the surface area of of Y zeolite, (H+), and of Cr—Y zeolite after exposure to 1000° C. as compared with the surface area of the Y zeolite which has not been exposed to 1000° C. (25° C.).

This invention relates to a method and apparatus for converting exhaust gas from an exhaust gas generating source, to innocuous products. By innocuous products is meant those that are generally considered to be harmless to health and the environment such as, $CO_2$, $N_2$, $H_2$, and water. The invention involves use of a thermally stable zeolite connected "in-line" with a main catalyst. By in-line according to the present invention is meant that there is a direct connection of the source of the exhaust gas with the zeolite and the main converter so that undiverted passage is provided for the exhaust gas from its source through the zeolite unit and the main converter, i.e., with no by-pass valving.

In order for a zeolite to be used as an "in-line" adsorber according to the present invention, the zeolites must have high thermal stability. For the purposes of the present invention, the degree of thermal stability is determined by measuring the surface area of the zeolite after exposure to a given temperature. The better the retention of surface area on exposure to high temperatures, the better is the thermal stablity. The specific surface area is measured by the known BET technique. The Cr-zeolites of the present invention, upon exposure to temperatures of up to about 1000° C. for about 6 hours, retain at least about 50% of the BET surface area of the zeolite at about room temperature, prior to exposure to the high temperature.

Zeolites with relatively low $SiO_2$ to $Al_2O_3$ mole ratios, that is, mole ratios of no greater than about 200, are very suitable for adsorbing hydrocarbons, especially low molecular weight hydrocarbons. However, generally speaking, their thermal stability is not high enough to allow them to be used in-line with a main catalyst.

By low molecular weight hydrocarbons is meant alkanes and alkenes with 1 to 6 carbon atoms. Some examples are ethylene, propylene, butadiene, pentene, and other unsaturated hydrocarbons.

The zeolites of the present invention have a $SiO_2$ to $Al_2O_3$ mole ratio of no greater than about 200, advantageously no greater than about 100, more advantageously about 3 to about 100 and most advantageously about 3 to about 20. Therefore, they are very good adsorbers for hydrocarbons. For thermal stability, the zeolite has rare earth, chromium, and combinations of these exchanged therein to some degree. By rare earth is meant those elements of the lanthanide series having atomic numbers 58 thru 71.

Some types of zeolites that are suited to the practice of the present invention are Y-type, ZSM-5, beta, mordenite, and combinations of these, the combinations depending on the types of adsorption (or conversion) desired. One particularly suited zeolite is the Y-type. A Y-zeolite can be obtained from a supplier, for example, TSZ-350 or TSZ-360 supplied by Tosoh Corporation and called "Ultra-stable Y-zeolite", or CBV 712 supplied by PQ corporation.

It is critical to the practice of the present invention that the alkali content of the zeolite before being exchanged with chromium ions, be less than about 0.5% by weight based on the oxide, and preferably no greater than about 0.25%. While not wishing to be bound by theory, it is believed that the exchange with chromium further reduces the alkali. As a result, the purity of the product Cr-exchanged zeolite with respect to alkali is insured in order to meet the high thermal stability requirements of the present invention. The low alkali zeolite can be obtained from a supplier. Or, the alkali content can be reduced by methods known in the art, for example by subjecting a zeolite having an alkali content greater than about 0.5 wt. %, to ion exchange with another cation. It is preferred that the alkali, eg., sodium-containing zeolite be contacted with a solution having hydrogen and/or ammonium ions as exchangeable cations, ammonium ions being more easily exchanged. Thereafter, the hydrogen and/or ammonium ions are exchanged for the chromium ions. The exchanging can be done by contacting the zeolite with a solution containing the hydrogen or ammonium ions into the zeolite at an appropriate temperature, typically from about 50° C. to about 95° C. for an appropriate length of time, typically about 1 to about 24 hours.

In accordance with one embodiment, the zeolite having the low alkali content is then treated with $Cr^{+3}$ and/or rare earth ions by any technique known in the art such as by contacting the starting zeolite with a solution of these ions. The zeolite can be contacted more than one time with fresh solution depending on how much Cr and/or rare earth is desired to be exchanged therein. The solution can be made by, dissolving any soluble salt that yields the ions and the invention is not limited to the nature of the solution. Examples of such salts include, but are not limited to: chromium or rare earth nitrates, chlorides, sulfates, etc. The specific amounts of chromium and/or rare earths that can be exchanged into the zeolite depend on the kind and quantity of other metals that are exchanged into the zeolite and that are desired to remain exchanged therein after the chromium and/or rare earth ions are exchanged. It also depends on the $SiO_2$ to $Al_2O_3$ mole ratio which in turn, determines the exchange capacity of the zeolite for chromium and/or rare earth ions, the capacity increasing as the $SiO_2$ to $Al_2O_3$ mole ratio decreases.

The zeolite can be in any form depending on the application. For example, the zeolite can be in powder form, self-supporting geometric shapes as bead, or pellet, monoliths, eg., extruded honeycombs, etc, or be in contact with a substrate, preferably a honeycomb substrate.

If the zeolite is in powder form, it can be slurried with the metal salt solution. If the zeolite is in a self supporting shape, the shape can be sprayed with, dipped into, or coated with the metal salt solution.

The resulting Cr and/or rare earth-exchanged zeolite is then washed if necessary, usually with deionized water to remove the excess chromium solution from the surfaces of the zeolite.

The Cr and/or rare earth-exchanged zeolite can be dried prior to the heat-treating step, at about 100° to about 110° C. in air for about 2 to about 24 hours.

The Cr and/or rare earth-exchanged zeolite is heat treated to stabilize it and produce the thermally stable zeolite. Heat treating temperatures are usually about 400° to about 600° C. Heat treating times are typically about 1 to about 24 hours and are carried out typically in air.

One technique for making Cr-zeolite, although it is to be understood that the invention is not limited to this technique, is as follows. The starting zeolite, eg., a Y-zeolite in the $H^+$ form is contacted with a solution of chromium nitrate at an elevated temperature, for example at about 50° to about 95° C. for a period of time of about 2 to 4 hours. Proportions of zeolite and chromium can vary depending on how much chromium is desired to be exchanged. However, typically, about 100 ml to about 1000 ml, of a solution of about 0.01 to about 0.5 molar chromium salt solution is mixed with about 10 to about 500 g of the zeolite. The zeolite is then removed from the resulting liquor by techniques such as filtration or decantation, and is then washed a number of times, typically about 2 to 6 times, with hot deionized water to wash away the excess chromium salt solution from the surfaces of the zeolite. In order to increase the Cr loading in the zeolite, the zeolite after separation from the liquor and usually prior to washing, can be recontacted with a fresh chromium salt solution. These steps of contacting (and washing, if desired), can be repeated until a sufficient amount of Cr is exchanged into the zeolite. The washed zeolite is then dried typically at about 100° to about 110° C. in air for about 2 to about 24 hours. The dried zeolite is then heat-treated in air at typically about 400° to about 600° C. for a sufficient time to stabilize the Cr in the zeolite and produce the thermally stable zeolite of the present invention.

The minimum amount of Cr in the zeolite that is required to impart thermal stability is a function of the zeolite $SiO_2$ to $Al_2O_3$ mole ratio, the kind and amounts of other metals present in the zeolite, etc. In general, the more Cr in the zeolite, the greater is the degree of thermal stability imparted to the zeolite. The levels of Cr in the thermally stable zeolite are greater than about 0.5 wt. %, advantageously greater than about 1.0 wt. % and even more advantageously greater than about 2.0 wt. %. The maximum amount of Cr that can be exchanged into the zeolite is limited by the zeolite exchange capacity.

FIG. 1 shows that at room temperature the starting zeolite has a BET surface area of greater than about 600 $m^2/g$. Upon heat treatment at about 1000° C. for about 6 hours, it suffers significant loss in surface area, of less than about 200 $m^2/g$. On the other hand, chromium-exchanging this zeolite permits a significantly higher part of the original surface area (>50%) (and therefore catalytic activity) to be retained.

Additionally, the zeolite can have other catalyst metals exchanged therein, such as base metals, eg., copper, or noble metals, eg., Pt, Pd, Rh or combinations of these. The noble metals catalyze combustion of any carbon ("coke") combustion that is deposited on the zeolite by the decomposition of the hydrocarbons in the exhaust gas. The level of noble metal is no greater than about 0.5% by weight of the Cr and/or rare earth-zeolite.

In accordance with one preferred embodiment, the zeolite is contacted with a substrate. In this technique, a slurry of the zeolite is contacted with a substrate to form a green coating thereon which is then dried and heat-treated. The slurry contains other components such as binders, and dispersing agents, etc, as is known in the art. Some binders are aluminum oxide, most preferred of which is the precursor boehmite, other precursors of aluminum oxide, e.g., aluminum nitrate, and silica, titania, zirconia, rare earth oxides, e.g., ceria, etc, and their precursors.

Some typical compositions are in percent by weight 0 to about 50 methylcellulose, 0 to about 50 silica, silica gel, or silica precursors, 0 to about 50 $Al_2O_3$ from boehmite, aluminum nitrate, or alumina sol, and about 50 to about 95 of the zeolite.

More preferred compositions are in percent by weight 0 to about 5 methylcellulose, 0 to about 30 silica, silica gel, or silica precursors, 0 to about 30 alumina from aluminum nitrate, 0 to about 15 alumina from boehmite, and about 70 to about 90 being the zeolite.

The zeolite can be blended with about 0.5 to about 2.0% methylcellulose (Dow A4M). In each case a slurry is formed in a suitable machine such as a ball mill, mixmuller, or double-arm mixer by admixing with a liquid medium optionally containing about 0.01 to about 1.0% by weight surface active agent such as Airco's Surfanol 485. The liquid medium is added to the solids to obtain about 25 to about 60 wt. % solids content. The preferred liquid medium is water, however organic liquids in combination with water can also be used, for example, isopropyl alcohol + water. Organic liquids by themselves can also be used, e.g., toluene or xylene. Optionally the slurry can have surfactants such as, Surfanol ®.

Application of the slurry to the substrate can be done by any convenient technique such as dipping, or spraying, depending on size and geometry of the substrate, and the invention is not limited to any technique. However, most typically it is done by dipping the substrate in the slurry followed removing the excess slurry by blowing it off. The substrate is then dried to remove the water. The dipping and drying is repeated if necessary until the desired amount of slurry components are applied.

The green coated substrate is heat treated at sufficient temperature for a sufficient time to form the zeolite as a washcoat on the substrate, and to bond the particulates of the washcoat to the substrate and to each other. The heat treating conditions vary with the specific slurry components, size and configuration of the substrate, and other processing conditions. However, in general the heat treating conditions are about 400° C. to about 700° C., and preferably about 500° C. to about 650° C. for about 3 to about 6 hours.

It is to be understood that the invention is not limited to the nature of substrate materials. However, the substrate is most desirably made of any material that is suitable for high temperature applications. Some preferred materials are those that include as a predominant phase: ceramic, glass-ceramic, glass, high surface area-high temperature stable oxides, metal, and combinations thereof. By combinations is meant physical or chemical combinations, eg., mixtures or composites. Some substrate materials that are especially suited to the practice of the present invention, although it is to be understood that the invention is not limited to these, are those made of cordierite, mullite, clay, talc, zircon, zirconia, spinel, alumina, silica, lithium aluminosilicates, alumina silica, feldspar, titania, fused silica, nitrides, carbides, borides, eg., silicon carbide, silicon nitride or mixtures of these. Some typical ceramic substrates are disclosed in U.S. Pat. Nos. 4,127,691 and 3,885,977. Those patents are herein incorporated by reference as filed. Some preferred metal substrates are stainless steels and iron group metal based bodies, (Fe, Co, Ni) such as, for example, Fe and Cr and/or Al bodies with optional additions of various metals and/or oxides for various properties. Some typical metal or metal alloy bodies are disclosed in U.S. Pat. Nos. 4,758,272 and 4,992,233 and U.S. application Ser. No. 07/767,889, filed Sep. 30, 1991, (European patent application publication no. 48871641, published Mar. 6, 1992). Those patents and application are herein incorporated by reference as filed. Electrically heated porous or non-porous substrates are also suitable.

The substrates can be of any size and shape suitable to the application. Preferred substrates are honeycomb structures. Some examples of honeycombs produced by the process of the present invention, although it is to be understood that the invention is not limited to these, are those having about 94 cells/$cm^2$ (about 600 cells/$in^2$), about 62 cells/$cm^2$ (about 400 cells/$in^2$), or about 47 cells/$cm^2$ (about 300 cells/$in^2$), those having about 31 cells/$cm^2$ (about 200 cells/$in^2$), or those having about 15 cells/$cm^2$ (about 100 cells/$in^2$). These bodies are made preferably of, but not limited, to materials which when fired form cordierite. Typical wall thicknesses in catalytic converter applications, for example, are about 6 mils (about 0.15 mm) for 400 cells/in² (62 cells/cm²) honeycombs. Wall thicknesses range typically from about 0.1 to about 0.6 mm, (about 0.004" to about 0.025"). The external size and shape of the body is controlled by the application, e.g. engine size and space available for mounting in an automotive exhaust treatment application.

The substrate can have any degree of porosity from low to high. For example, typically the wall porosity ranges from about 0% by volume to higher values which are determined by practical limits depending on the composition of the substrate and the intended application. For example, in metal monoliths, the open porosity is typically about 1 to about 2% by volume, although it can be as high as about 40%. For ceramic monoliths, the open porosity is typically about 25% to about 50% by volume.

The main catalyst can be any catalyst that converts $NO_x$, CO, and hydrocarbons to innocuous products and the invention is not intended to be limited to any specific $NO_x$, CO, and hydrocarbon conversion catalyst. Some preferred main catalysts are for example, noble metal as eg, Pt, Pd, Rh, or combinations thereof on alumina, ceria, lanthana, zirconia, yttria, or combinations thereof. It is especially preferred to use a three-way catalyst. Some typical three-way catalysts which are especially suited to the practice of the present invention for auto exhaust conversion are Pt on ceria-alumina combined with Rh on zirconia. The Pt-ceria-alumina and the Rh-zirconia can be combined and applied at once, as in a single coating or they can be applied in separate coatings. Another suitable catalyst is Pt/Pd/Rh on gamma alumina with a rare earth oxide such as ceria.

The zeolite, in any convenient form is directly connected with the exhaust gas, and upstream of the main catalyst. Depending on other demands of the system, it is possible to include additional zeolite units connected to the original zeolite unit or the main catalyst.

In accordance with a preferred embodiment, the zeolite is positioned upstream of the main catalyst, so that the exhaust gas flows directly to the zeolite, is contacted with the zeolite and then flows from the zeolite directly to the main catalyst. For example, the zeolite in powder form, pellets, beads, etc. can be in a container having an inlet and outlet end through which the exhaust gas passes to come in contact with the zeolite. The zeolite can be in a self supporting shape having its inlet and outlet ends connected by conduits to the exhaust gas and to the main catalyst respectively. One preferred self supporting form is a honeycomb which is made typically by extrusion. The exhaust gas passes through the cells of the honeycomb from inlet to outlet end. Or the zeolite can be in contact with a substrate as described previously which has inlet and outlet ends connected to the exhaust gas and main catalyst respectively. One preferred substrate is a honeycomb substrate. Exhaust gas is carried through a conduit to the substrate, passes through the open ended cells of the honeycomb to come in contact with the zeolite, and exits the substrate and is carried by a conduit to the main catalyst. The zeolite and main catalyst can share one substrate with the zeolite being on upstream end and the main catalyst being on the downstream end so that the exhaust gas flows to the substrate where it is first contacted with the zeolite and then with the main catalyst after which it exits the substrate.

Optionally, a means for injecting air into the zeolite adsorber such as an air injection pump may be present. The function of such an air injection system is to regenerate the zeolite adsorber after the main catalyst has reached its operating temperature. Alternately, the zeolite can be regenerated by the exhaust gas itself, by operating the engine under fuel lean or oxidizing conditions, for a short period of time after the main catalyst has reached light-off temperature, so that there is a sufficient excess of oxygen in the exhaust. The objective of such regeneration is to oxidize any carbon or "coke" deposited on the zeolite surfaces, so that the capacity for adsorption is recovered (for the next start-up) cycle.

Figure 2:
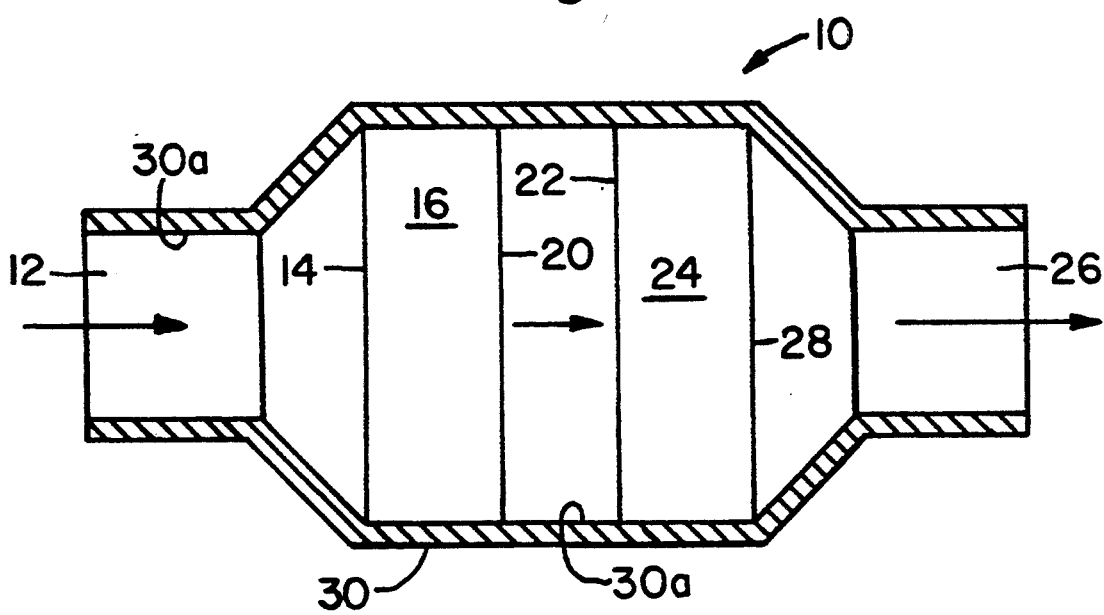
FIG. 2 is a schematic diagram showing the zeolite of the present invention connected in-line with a main catalyst in which they share a single cannister.

FIG. 2 is a schematic diagram showing one type of arrangement of the improved exhaust gas conversion system of the present invention. The system (10) is made of a first conduit (12) which is connected to the inlet end (14) of the zeolite conversion unit (16) which is preferably a zeolite in contact with a honeycomb substrate, such as a ceramic, preferably cordierite substrate, or a zeolite in the form of a honeycomb. An exhaust gas mixture such as auto exhaust, is conveyed in its entirety through the first conduit to the inlet end of the zeolite unit, into the zeolite unit to undergo hydrocarbon adsorption. A second conduit (18) is connected at one end to the outlet end (20) of the zeolite unit. The other end of the second conduit is connected to the inlet end (22) of main converter (24). The exhaust gas in modified form is conveyed through the second conduit to the second unit to undergo conversion of $NO_x$, Co, and hydrocarbons. The second conduit is connected only to the outlet end of the zeolite unit and the inlet end of the main converter unit. An exit conduit (26) is shown connected to the outlet end (28) of the main catalyst unit. The main catalyst unit as shown is typically a honeycomb substrate having the catalyst in contact therewith, such as for example, by washcoating. The converted gas mixture passes through the exit conduit to ambient atmosphere. The arrows indicate the direction of flow through the apparatus.

It is to be understood that the respective conduits can be connected to the respective units by any means known in the art. It is to be understood also that respective sizes and lengths of the conduits and units can vary depending on the application and that the invention is not limited to any sizes or size relationships of conduits and catalyzed units.

FIG. 2 shows the units in a conventional canister or can shown as (30) with the inner surface shown as 30a, as is used in automotive applications. The units are held fixed in the canister by conventional means such as, for example, by metal mesh, or ceramic mats, etc. Refractory fibrous material is often used to prevent passage of gases between the units and the canister. The various sections of the can serve as the respective conduits and for the purposes of the present invention are considered to be connected to the units.

Figure 3:
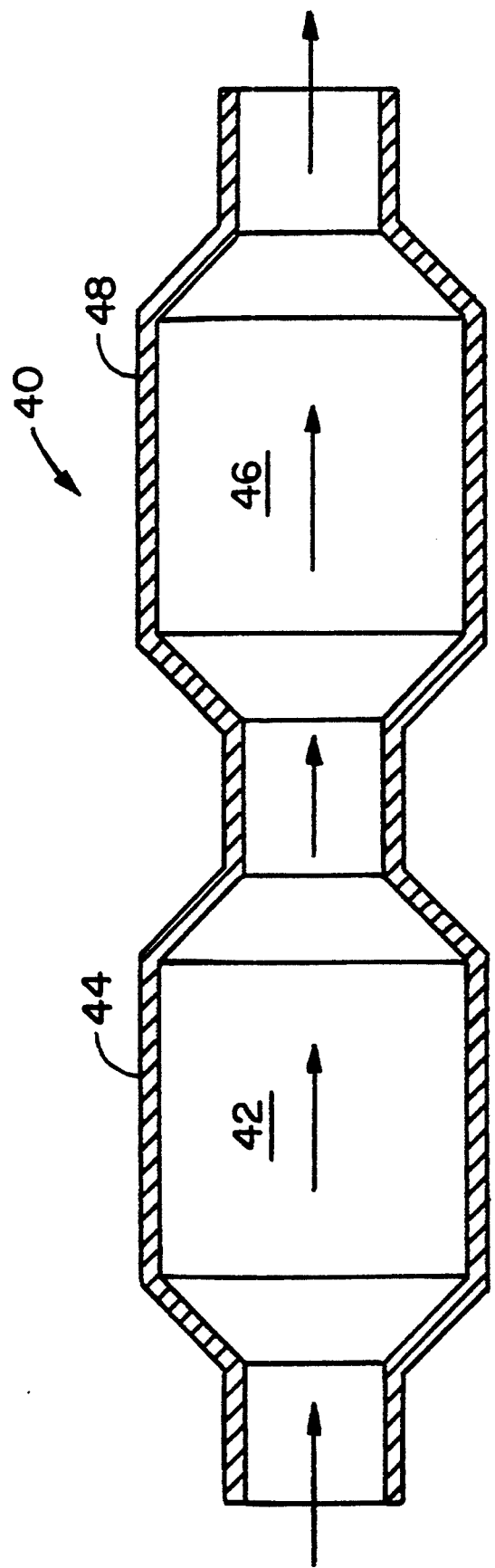
FIG. 3 is a schematic diagram showing the zeolite of the present invention connected in-line with a main catalyst, with each being in a separate cannister.

The units can be in separate cannisters. FIG. 3 is a schematic diagram showing an exhaust gas conversion system (40) in which the zeolite unit (42) and the main catalyst unit (46) are in separate cannisters (44) and (48) respectively, and connected to one another and to an exhaust gas source in essentially the same manner as shown in the system in FIG. 2.

To more fully illustrate the invention, the following non-limiting examples are presented. All parts, portions, and percentages are on a weight basis unless otherwise stated.

EXAMPLE

An $(NH_4)^+$ form Y-zeolite such as CBV-712 zeolite supplied by PQ Corporation having a $SiO_2$ to $Al_2O_3$ mole ratio of about 12 is exchanged with $Cr^{+3}$ by contacting it with a $Cr(NO_3)_3$ solution, and refluxing the mixture at about 80°–95° C. for at least about 2 hours. The Cr-exchanged zeolite is thoroughly washed and separated from the liquids, dried at about 100° C. for at least about 8 hours in air, and heat-treated at about 400°–550° C. for about 6–12 hours. The Cr-exchanged zeolite and boehmite alumina binder such as Dispersal ® from Condea Chemie are mixed in a ratio of about 85 to 15. The mixture is slurried with sufficient deionized water such that about 50 wt. % solids is obtained. This slurry is mixed with $Al_2O_3$ media of about 3 times the weight of the solids in the slurry and rolled in a suitable Nalgene container on a set of rolls for about 2 hours. The pH of the slurry is then adjusted to about 3.5 with dilute nitric acid. To the slurry is added 0.5 wt. % (on a solids basis) of a surfactant such as Surfanol ® supplied by Air Products and Chemicals Co. The viscosity of the slurry is measured using a Brookfield viscometer. A viscosity of about 5–15 centipoise is generally desirable. If the viscosity is too high, water is slowly added to dilute the slurry to the desirable range. A cordierite honeycomb substrate having about 400 cells/in$^2$ (about 62 cells/cm$^2$) with about 0.006" (about 0.015 mm) thick walls is used to support the zeolite. The zeolite slurry is washcoated by dipping the honeycomb substrate completely into the slurry, removing it, blowing the excess slurry off with air and drying it at about 100° C. for about 30–60 minutes. The weight of the washcoat on the substrate is monitored, and the dipping and drying procedure is repeated until about 35–45% washcoat (i.e., about 35–45 g of washcoat per about 100 g of substrate) is deposited on the substrate. Following this, the washcoated substrate is calcined in air at about 500°–600° C. for about 2–6 hours. The size of the substrate for the zeolite adsorber unit is a function of the volume of exhaust gases to be treated, and therefore, a function of the engine size. Substrate volumes can range from about 0.5 to about 4.0 liters. The Cr-zeolite washcoated substrate is packaged in a steel can using refractory fiber or mat insulation according to techniques known in the art. A three-way catalyst (main catalyst) is prepared according to techniques known in the art. Typically, a Pt/Pd/Rh catalyst on about 70% gamma $Al_2O_3$ and about 30% $CeO_2$ washcoated on a cordierite honeycomb is used. The (Pt+Pd):Rh ratio is typically about 5:1 to 10:1, with a Pt:Pd ratio of about 1:1 to about 3:2. The total precious metal loading is about 30–60 g/ft$^3$ of substrate, (about 10–21 g/l). This catalyst coated substrate is also packaged in a steel can with refractory fiber or mat insulation using techniques known in the art. The Cr-zeolite adsorber and main catalyst units are placed in the exhaust stream of an internal combustion engine such that the adsorber is upstream and the main catalyst is downstream. The engine exhaust port, the adsorber, and the main catalyst are all connected directly, i.e., without any valving or by-pass lines. When the engine is turned on from a cold condition, the exhaust initially contains an excess of hydrocarbons from uncombusted fuel. The Cr-zeolite adsorbs a significant proportion of the cold-start hydrocarbon emissions ("cold-start" emissions are defined as the emissions during engine start-up from ambient temperature, that are emitted prior to the main catalyst reaching its light-off temperature, about 300°–400° C.). This time period is typically about 60–180 seconds after the engine has been turned on. In particular, the light alkenes, such as ethene, propylene, etc., are very effectively adsorbed, especially after the adsorber reaches a temperature of about 70°–90° C. Once the main catalyst reaches its light-off temperature, the main catalyst starts to very effectively convert CO and $NO_x$ emissions. Furthermore, by this time, the zeolite adsorber has reached temperatures of about 300°–400° C. and begins to desorb some of the adsorbed hydrocarbons. The desorbed hydrocarbons can include cracked hydrocarbons and/or oxides of carbon such as CO, and $CO_2$. At this time, the zeolite adsorber is effectively purged of adsorbed hydrocarbons as well as any carbonaceous deposits from the hydrocarbon adsorption (generally referred to as "coke") by one of two methods: (1) an air injection pump connected to the inlet of the adsorber is turned on for about 30–120 seconds to provide the excess oxygen required for regeneration, or (2) the engine stoichiometry is switched to a "lean" operation for about 30–120 seconds so that there is sufficient excess oxygen in the exhaust to regenerate the zeolite. In either case, Cr in the zeolite is a very effective catalyst for decoking the zeolite (oxidation of carbon) and virtually the entire capacity of the zeolite adsorber is recovered by this process. The exhaust gases from the regenreation as well as the engine exhaust now contain CO, $NO_x$, and hydrocarbons (among other non-regulated, non-toxic gases) which are effectively converted to innocuous products by the main catalyst since it is at its operating temperature.

It should be understood that while the present invention has been described in detail with respect to certain illustrative embodiments thereof, it should not be considered limited to such but may be used in other ways withoud departing from the spirit of the invention and the scope of the appended claims.

What is claimed is:

1. An apparatus suitable for converting exhaust gases from an exhaust gas generating source, to innocuous products, said apparatus comprising:
    a) a zeolite unit for adsorbing hydrocarbons, said zeolite being selected from the group consisting of Y zeolite, Beta, ZSM-5, mordenite, and combinations thereof, and having a $SiO_2$ to $Al_2O_3$ mole ratio of no greater than about 200, said zeolite being ion exchanged with a metal consisting of chromium, wherein the chromium content in the zeolite is greater than about 0.5% by weight;
    b) a main catalyst unit for converting $NO_x$, CO, and hydrocarbons to innocuous products positioned downstream from said zeolite unit; and
    c) conduit means for connecting said units with one another and with said source, and for providing undiverted passage of said exhaust gas from said source sequentially to and through said units.

2. An apparatus of claim 1 wherein said zeolite is a Y-type.

3. An apparatus of claim 1 wherein said ratio is no greater than about 100.

4. An apparatus of claim 3 wherein said mole ratio is about 3 to about 100.

5. An apparatus of claim 3 wherein said ratio is about 3 to about 20.

6. An apparatus of claim 1 wherein the alkali content of said zeolite is less than about 0.5% by weight based on the oxide.

7. An apparatus of claim 5 wherein said alkali content is no greater than about 0.25% by weight.

8. An apparatus of claim 1 wherein said zeolite is in contact with a substrate.

9. An apparatus of claim 8 wherein said substrate is a honeycomb structure.

10. An apparatus of claim 1 wherein said chromium content is greater than about 1.0% by weight.

11. An apparatus of claim 10 wherein said chromium content is greater than about 2.0% by weight.

* * * * *